(12) United States Patent
Neubeker et al.

(10) Patent No.: US 11,274,440 B2
(45) Date of Patent: Mar. 15, 2022

(54) SUSPENSION CEILING SUPPORT CLIP

(71) Applicant: CertainTeed Ceilings Corporation, Malvern, PA (US)

(72) Inventors: Bryan Neubeker, Bragg Creek (CA); Tony Paolucci, Bragg Creek (CA); Lorenzo Salazar, Westfield, IN (US); Robin C. Czyzewicz, Wilmington, DE (US)

(73) Assignee: CertainTeed Ceilings Corporation, Malvern, PA (US)

( * ) Notice: Subject to any disclaimer, the term of this patent is extended or adjusted under 35 U.S.C. 154(b) by 426 days.

(21) Appl. No.: 16/233,659

(22) Filed: Dec. 27, 2018

(65) Prior Publication Data

US 2019/0203467 A1    Jul. 4, 2019

Related U.S. Application Data

(60) Provisional application No. 62/753,791, filed on Oct. 31, 2018, provisional application No. 62/611,593, filed on Dec. 29, 2017.

(51) Int. Cl.
| | |
|---|---|
| *E04B 9/16* | (2006.01) |
| *E04B 9/20* | (2006.01) |
| *F16B 2/24* | (2006.01) |
| *E04B 9/06* | (2006.01) |

(52) U.S. Cl.
CPC ............... *E04B 9/16* (2013.01); *E04B 9/205* (2013.01); *F16B 2/245* (2013.01); *E04B 9/068* (2013.01)

(58) Field of Classification Search
CPC .... E04B 9/16; E04B 9/205; F16B 2/24; F16B 2/241; F16B 2/245; F16B 2/246; F16B 7/0943; Y10T 403/7117; Y10T 403/7123; Y10T 403/7176; Y10T 403/7194; Y10T 403/7171
USPC ...... 52/506.07, 506.08, 665, 712; 248/228.1, 248/228.2, 228.7, 247, 248, 300, 152, 248/174, 317, 342, 343; D8/349, 354, D8/380
See application file for complete search history.

(56) References Cited

U.S. PATENT DOCUMENTS

| | | | | |
|---|---|---|---|---|
| 656,275 | A * | 8/1900 | Streeter | E04B 9/16 403/387 |
| 2,841,255 | A * | 7/1958 | Kemp | E04B 9/001 52/395 |
| 3,029,055 | A * | 4/1962 | Smith | F27D 1/024 248/228.3 |
| 3,596,425 | A * | 8/1971 | Kodaras | F16B 7/0406 52/665 |

(Continued)

FOREIGN PATENT DOCUMENTS

EP    0808958 A2 * 11/1997 ............. E04B 9/006

*Primary Examiner* — Amber R Anderson
*Assistant Examiner* — Alexus Camero
(74) *Attorney, Agent, or Firm* — McDonnell Boehnen Hulbert & Berghoff LLP

(57) ABSTRACT

A suspension ceiling support clip including a body, a snap-fit connector disposed on the body, and a locking member disposed on the body. The snap-fit connector is configured to receive a first beam of a suspension ceiling that extends in a first direction. The locking member is configured to receive a second beam of the suspension ceiling that extends in a second direction, where the first direction is perpendicular to the second direction.

17 Claims, 9 Drawing Sheets

(56) References Cited

U.S. PATENT DOCUMENTS

| | | | | |
|---|---|---|---|---|
| 4,656,794 | A * | 4/1987 | Thevenin | E04D 3/3608 |
| | | | | 52/22 |
| 4,838,002 | A * | 6/1989 | Dajnko | E04B 9/008 |
| | | | | 52/238.1 |
| 4,848,054 | A * | 7/1989 | Blitzer | E04B 9/005 |
| | | | | 52/506.07 |
| 5,265,393 | A * | 11/1993 | Bischel | E04B 9/064 |
| | | | | 52/461 |
| 5,335,890 | A * | 8/1994 | Pryor | A47H 1/04 |
| | | | | 16/94 D |
| 6,058,859 | A * | 5/2000 | Colosimo, Jr. | F27D 1/021 |
| | | | | 110/332 |
| 6,536,173 | B2 * | 3/2003 | Rebman | E04B 9/068 |
| | | | | 52/465 |
| 7,726,635 | B2 * | 6/2010 | Heard | E04H 17/1413 |
| | | | | 256/48 |
| 8,834,057 | B2 * | 9/2014 | Adams, Jr. | F16B 7/00 |
| | | | | 403/233 |
| 9,745,746 | B2 * | 8/2017 | Heesbeen | E04B 9/30 |
| 9,976,303 | B2 * | 5/2018 | Glottis | E04B 9/18 |
| 10,174,501 | B1 * | 1/2019 | Underkofler | E04B 9/366 |
| 2006/0010812 | A1 * | 1/2006 | Jones | E04B 9/068 |
| | | | | 52/506.07 |
| 2020/0366076 | A1 * | 11/2020 | Naugler | H02G 3/32 |

* cited by examiner

SUSPENSION CEILING SUPPORT CLIP

CROSS-REFERENCE TO RELATED APPLICATIONS

This application claims the benefit of priority of U.S. Provisional Patent Application No. 62/753,791, filed Oct. 31, 2018; and U.S. Provisional Patent Application No. 62/611,593, filed Dec. 29, 2017, each of which is hereby incorporated herein by reference in its entirety.

CROSS-REFERENCE TO RELATED APPLICATIONS

1. Field of the Disclosure

The present disclosure relates generally to a support clip, for example, suitable for connecting beams of a suspension ceiling grid. The present disclosure relates more particularly to a support clip for connecting a beam extending in a first direction to a beam extending in a second direction.

2. Technical Background

Suspension grids that hold up drywall panels, acoustic ceiling tiles, lighting fixtures, or other tiles or panels, are an effective way to construct an attractive and convenient ceiling. In a conventional arrangement, beams are suspended from a structural support using hanger wire. When using drywall, the drywall panel is then attached to the beams using fasteners, such as screws. If panels other than drywall are used, they may be similarly attached to the beams, or can simply rest on a horizontally-extending flange of the beam.

Some modern grid systems use a channel that is attached to the surrounding walls of the room. The grid may then be formed of beams—often T-beams—that are held up by the channels and structurally supported by the walls. If the width of the room is modest, the channels at the side walls may provide sufficient support to hold up the entire ceiling. However, if the span of the beams is long, additional support is needed, especially when relatively heavy tiles or panels (e.g., drywall) are used. Rather than supporting each beam with individual hanger wire, a cross beam may be used to support several beams, and the cross beam may be supported by hanger wire or another support method.

Cross beams are often attached to the main beams by slipping an element over the end of each beam and sliding the element to a middle area of the beam. This makes the use of a cross beam cumbersome, as the elements must be slid into place before the beams are installed on the side walls. The present inventors recognized that a more convenient and faster way to attach cross beams to the main beams of a ceiling grid would be advantageous and attractive to builders.

SUMMARY OF THE DISCLOSURE

In one aspect, the present disclosure provides a suspension ceiling support clip comprising:
a body;
a snap-fit connector disposed on the body and configured to receive a first beam of a suspension ceiling that extends in a first direction; and
a locking member disposed on the body and configured to receive a second beam of the suspension ceiling that extends in a second direction, wherein the first direction is perpendicular to the second direction.

In another aspect, the disclosure provides a method of connecting two beams of a suspension ceiling grid, the method comprising:
providing a first beam of a suspension ceiling grid that extends in a first direction;
attaching a support clip to the first beam, the support clip including: a body,
a snap-fit connector disposed on the body and configured to receive the first beam, and
a locking member disposed on the body and configured to receive a second beam, wherein the attaching the support clip to the first beam uses the snap-fit connector of the support clip; and
connecting a second beam that extends in a second direction to the first beam by attaching the second beam to the support clip using the locking member, wherein the second direction is perpendicular to the first direction.

In another aspect, the disclosure provides a method of positioning components of a suspension ceiling grid, the method comprising:
providing a plurality of first beams of a suspension ceiling that each extend in a first direction;
connecting a second beam to the plurality of first beams by:
attaching a support clip to each of the first beams, the support clip including a body, a snap-fit connector disposed on the body and configured to receive the respective first beam, and a locking member disposed on the body and configured to receive a second beam, wherein the attaching the support clip to each of the first beams uses the snap-fit connector of the support clip, and
connecting the second beam to each of the support clips using the respective locking members, wherein the second beam extends in a second direction, and wherein the second direction is perpendicular to the first direction.

In another aspect, the disclosure provides a suspension ceiling grid comprising:
a plurality of first beams extending in a first direction;
a respective support clip attached to each of the first beams, each support clip including:
a body;
a snap-fit connector disposed on the body and configured to receive the respective first beam of the suspension ceiling; and
a locking member disposed on the body; and
a second beam extending in a second direction and attached to each of the support clips using the respective locking members.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

As described above, the present inventors have noted that conventional components and methods for connecting a cross beam to the main beams of a suspended ceiling grid are cumbersome and inefficient. The present inventors have developed components that are more efficient and easier to use for making such a connection.

Figure 2:
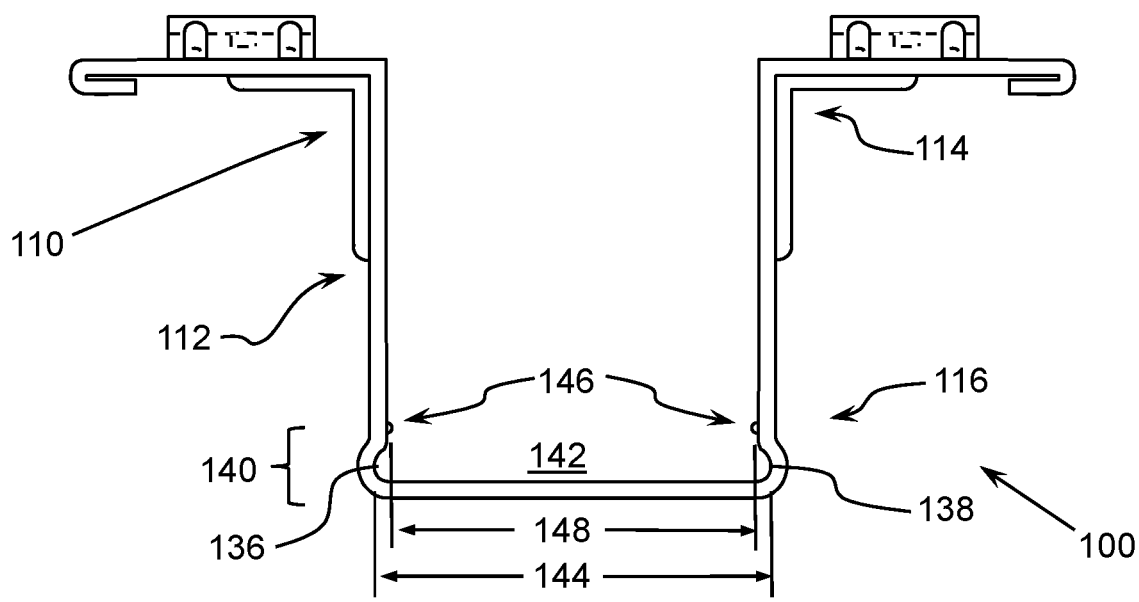
FIG. 2 is a schematic cross-sectional view of the support clip of FIG. 1.
Figure 3A:
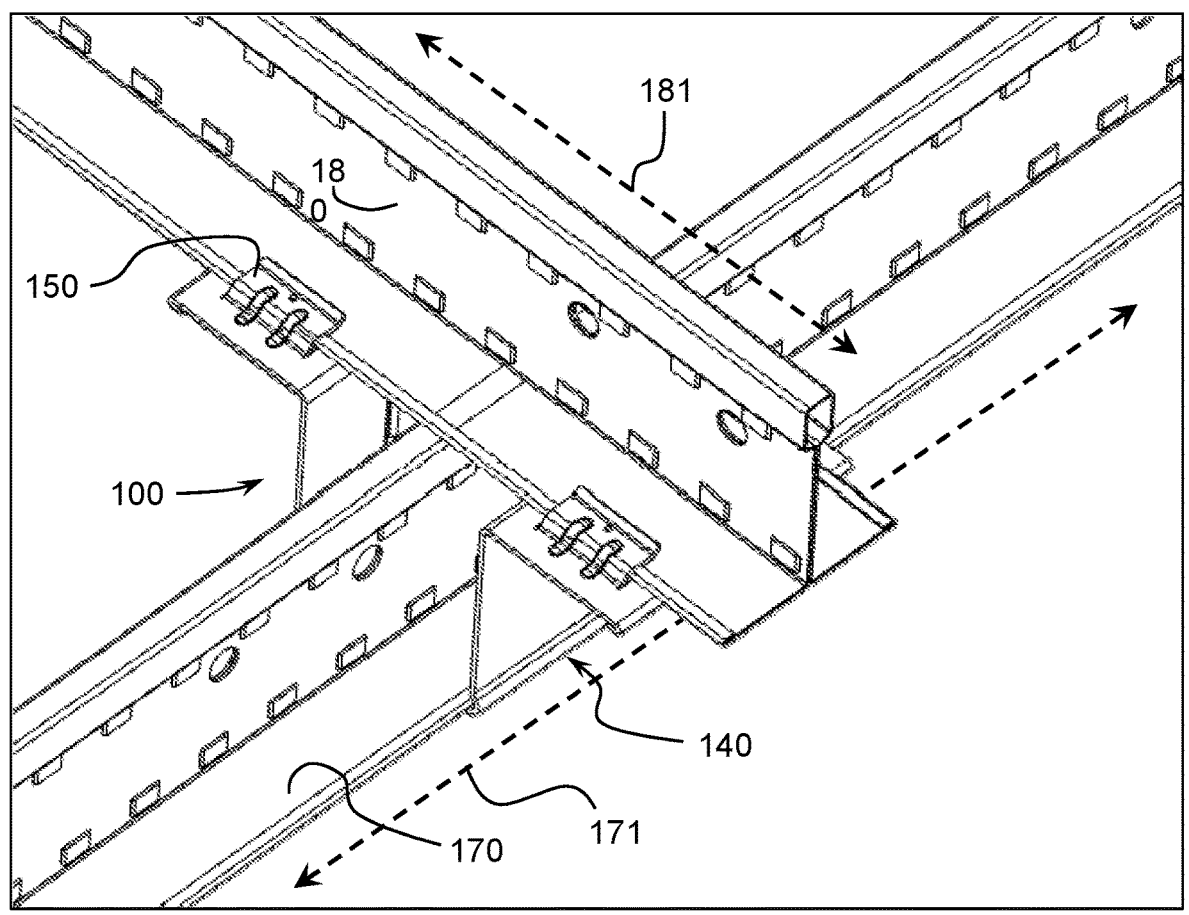
FIG. 3A is a schematic front, top perspective view of first and second beams connected using the support clip of FIG. 1.
Figure 3B:
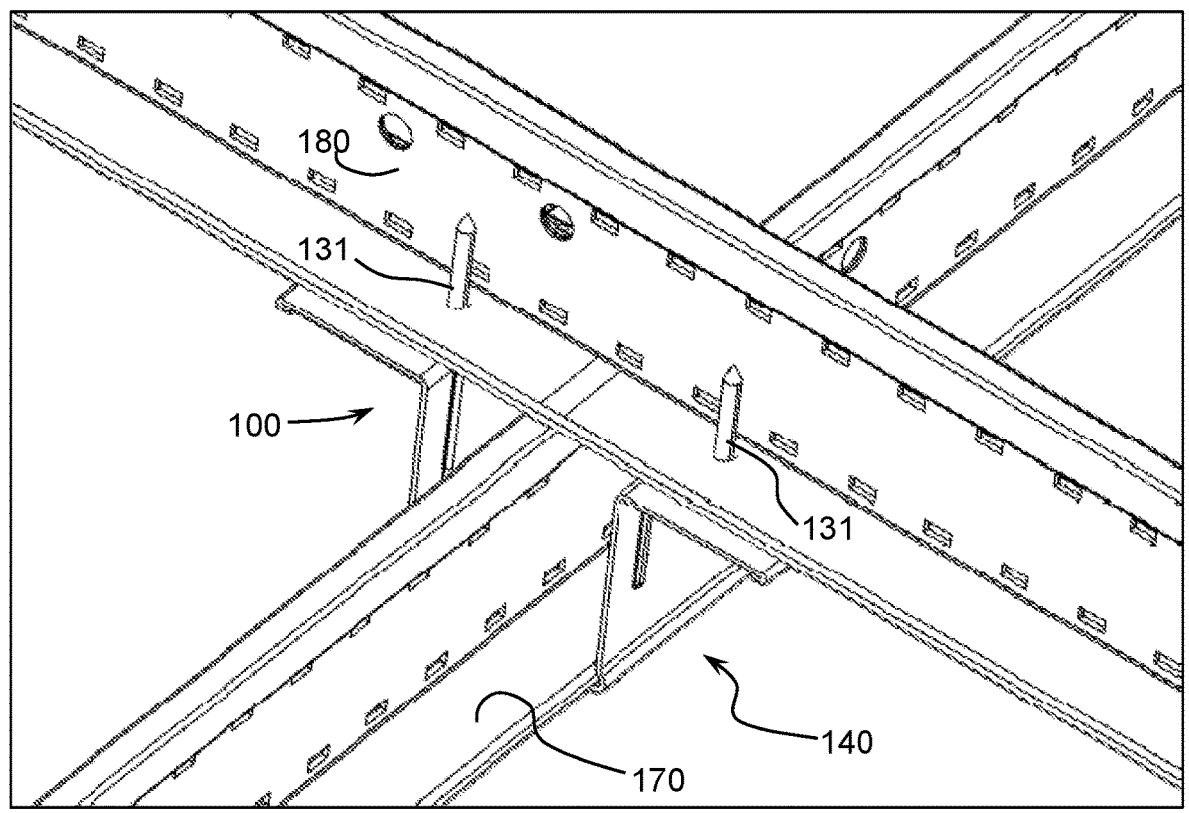
FIG. 3B is a schematic rear, top perspective view of the configuration of FIG. 3A.

Accordingly, one aspect of the disclosure is a suspension ceiling support clip. One embodiment of such a support clip is shown in perspective view in FIG. 1 and cross-sectional view in FIG. 2. Suspension ceiling support clip 100 includes a body 110, a snap-fit connector 140 disposed on the body 110, and locking member 150 disposed on the body. The snap-fit connector 140 is configured to receive a first beam 170 of a suspension ceiling that extends in a first direction 171, and the locking member 150 is configured to receive a second beam 180 of the suspension ceiling that extends in a second direction 181, where the first direction 181 is perpendicular, i.e., orthogonal to the second direction 171, as shown in FIGS. 3A and 3B.

The term snap-fit, as used herein, is defined as a connection between components where at least one of the components undergoes a deflection as the components are connected. Accordingly, a corresponding deflection is needed in order to disconnect the assembled components. Such a snap-fit connection can provide a relatively stable attachment without the need for any additional fasteners. In some cases, the snap-fit connection can hold the components in place until a more permanent attachment is established. Alternatively, the snap-fit connection may provide the final connection of the components. The deformation that occurs may be elastic, such that the components return to their original shape after the connection is made or after the components are disconnected. Alternatively, the deformation can be plastic and a permanent connection can be established.

A snap-fit connection, as the term is used herein, encompasses connections where either or both of the components being attached can undergo the deformation. Thus, the snap-fit connector of the support clip can undergo a deformation as it is attached to the corresponding beam, or the snap-fit connector can receive a portion of the beam that is deflected as the clip and beam are attached.

For example, as described in more detail below, the clip 100 may flex as the snap-fit connector 140 receives a portion of the first beam. In other embodiments, however, a portion of the beam may flex. Or in many instances, each of the clip 100 and beam may undergo some amount of deflection as these components are attached to one another.

In certain embodiments as otherwise described herein, the snap-fit connector includes a receptacle having a width and a restricted opening providing access to the receptacle, where the restricted opening has a width that is smaller than the width of the receptacle. For example, as shown in FIG. 2, the snap-fit connector 140 includes a receptacle 142 having a width 144 and a restricted opening 146 providing access to the receptacle 142. The restricted opening 146 has a width 148 that is smaller than the width of the receptacle 142. In operation, as clip 100 is attached onto a beam, the clip may undergo some deflection in order to widen restricted opening 146 so that the beam may pass into receptacle 142. Once the corresponding portion of the beam is securely inside the receptacle, clip 100 may return to its original shape and restricted opening 146 can serve to retain the beam inside snap-fit connector 140. Alternatively or additionally, in some embodiments it is possible for a portion of the beam to undergo deflection so that it can fit through the restricted opening. In such a case, the beam may return to its original shape once inside the receptacle so that it is retained by the restricted opening.

In certain embodiments as otherwise described herein, the receptacle includes a first groove and an opposing second groove facing the first groove, where the width of the receptacle extends from an inner surface of the first groove to an inner surface of the second groove. For example, receptacle 142 includes a first groove 136 and an opposing second groove 138 facing first groove 136. Here, the width 144 of receptacle 142 extends from an inner surface of first groove 136 to an inner surface second groove 138. The area of support clip 100 that is adjacent to grooves 136, 138 provides the restricted opening. In other words, the depth of the opposing grooves 136, 138 forms the portion of the receptacle 142 that has a widened width.

In certain embodiments as otherwise described herein, the restricted opening includes a plurality of protrusions adjacent to the receptacle. For example, clip 100 includes a plurality of protrusions 149 that extend inward toward the opposing side of the clip. Protrusions 149 are formed in a row along a respective groove 136, 138 of receptacle 142. Thus, the protrusions 149 further limit the width 148 of restricted opening 146. Accordingly, when a beam is inserted into snap-fit connector 140, the beam has to pass over protrusions 149 before being inserted into receptacle 142. In some embodiments, the force required for the beam to pass the protrusions results in a click as the beam is inserted into receptacle. This click can provide a positive confirmation of engagement of the beam into the clip.

In some embodiments the restricted opening is formed by both the edges of the groove as well as the peaks of the protrusions. For example, the grooves 136, 138 and protrusions 149 of clip 100 both contribute to the restricted opening 146. In other embodiments, the grooves alone provide receptacle and the edges of the grooves form the restricted opening. Still in other embodiments, the clip does not include any grooves, and the restricted opening is provided by protrusions, while the receptacle is provided by the space in the clip that is beyond the protrusions. Likewise, in some embodiments, only one side of the clip includes a groove, and in some embodiments only one side of the clip includes protrusions.

In certain embodiments, each protrusion is formed as a dimple in the body of the clip. In other embodiments, the protrusions are in the form of elongated rib in the body. In some embodiments, the protrusions are stamped in the body of the clip. Still, in other embodiments, each protrusion is a bead or ridge that is welded or adhered to a surface of the body of the clip.

In certain embodiments as otherwise described herein, the body of the clip includes a support surface and the locking member includes a locking tab that extends over the support surface, where the locking tab and support surface form an aperture therebetween. For example, body 110 includes a support surface 132 and locking member 150 includes a locking tab 152 that extends over the support surface to form an aperture between tab 152 and surface 132.

Figure 4A:
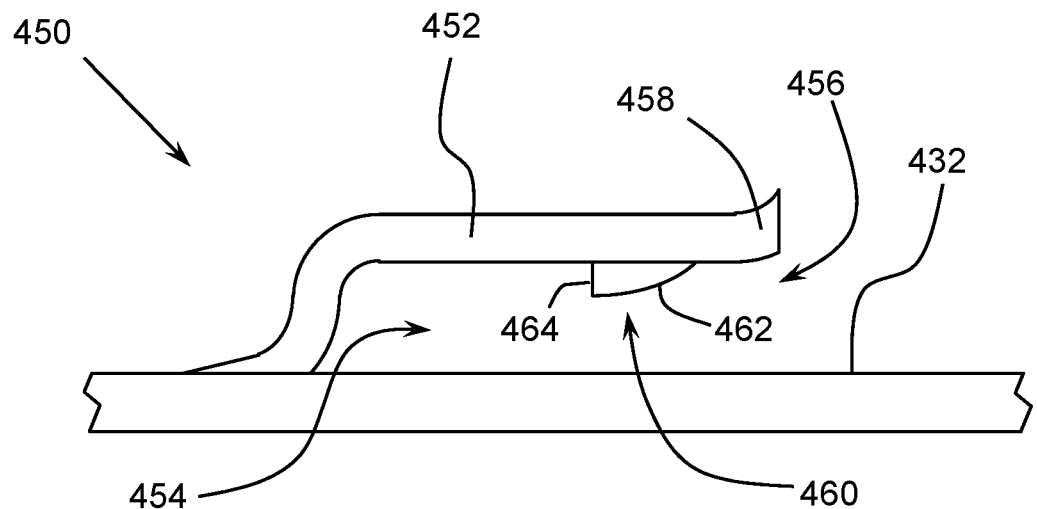
FIG. 4A is a detailed schematic cross-sectional view of a locking member of a support clip according to an embodiment of the disclosure.

In certain embodiments, the aperture between the support surface and locking tab is configured to receive a portion of a beam therein. For example, FIG. 4A shows a detailed view of another embodiment of a clip that includes a locking member 450. The clip includes a body 410 having a support surface 432 and a locking member 450 that includes a locking tab 452 extending over support surface 432. The locking tab and the support surface form an aperture 454 therebetween. Aperture 454 is configured to receive a portion or component of a beam so that the clip and the beam can be held securely together. Thus, in order to attach the beam to the clip using locking member 450, the component of the beam may be inserted into aperture 454 between locking tab 452 and support surface 432, as shown in FIG. 4A.

In certain embodiments as otherwise described herein, an end of the locking tab curves away from the support surface. For example, end 458 of the locking tab 452 curves away from support surface 432, which allows for easier insertion of the beam component that is inserted therein. The curved end 458 provides a wider opening at the open end 456 of the aperture 454. Accordingly, the beam component can be guided into the aperture 454 and a precise positioning of the corresponding components before the connection is not necessary.

In certain embodiments as otherwise described herein, the locking tab includes a catch extending into the aperture. For example, locking tab 452 includes a catch 460 that extends into aperture 454. Catch 460 is configured to retain the beam component in aperture 454 when the clip and a corresponding beam are attached. For example, catch 460 may interact with a ridge, edge or other protrusion on the beam so that the catch can hold the beam in place within aperture 454. To form the connection between catch 460 and the beam, a portion of locking member 450 can flex so that the corresponding component of the beam can move past the catch 460. For example, either catch 460 itself can deform and move outward away from support surface 432 as the component of the beam passes, or the entire locking tab 452 can bend outward as the component of the beam passes catch 460.

In certain embodiments as otherwise described herein, the catch includes a soft edge facing an open end of the aperture and a soft edge facing the inner end of the aperture. For example, catch 460 includes a soft edge 462 facing an open end 456 of aperture 454 and a sharp edge 464 facing the inner end of the aperture 454. The term soft edge, as used herein, refers to a rounded edge or an angled surface that allows a component being inserted into the aperture to easily push the catch out of the way until it latches back into place after the component is fully inserted. The sharp edge, on the other hand, prevents unintended removal of the beam component from the locking member. It is also possible for the catch to include soft edges on the side facing the opening and the side facing the inner end of the aperture. For example, in some embodiments, the catch is formed as a dimple formed in the surface of the locking tab. In particular, the locking member 150 of clip 100 includes a catch 180 in the form of a dimple positioned toward the center of locking tab 152. As a result, the beam component can more easily move into and out of aperture 154 to engage and disengage locking member 150. Nonetheless, catch 180 still serves to hold the clip 100 and the corresponding beam together.

Figure 5:
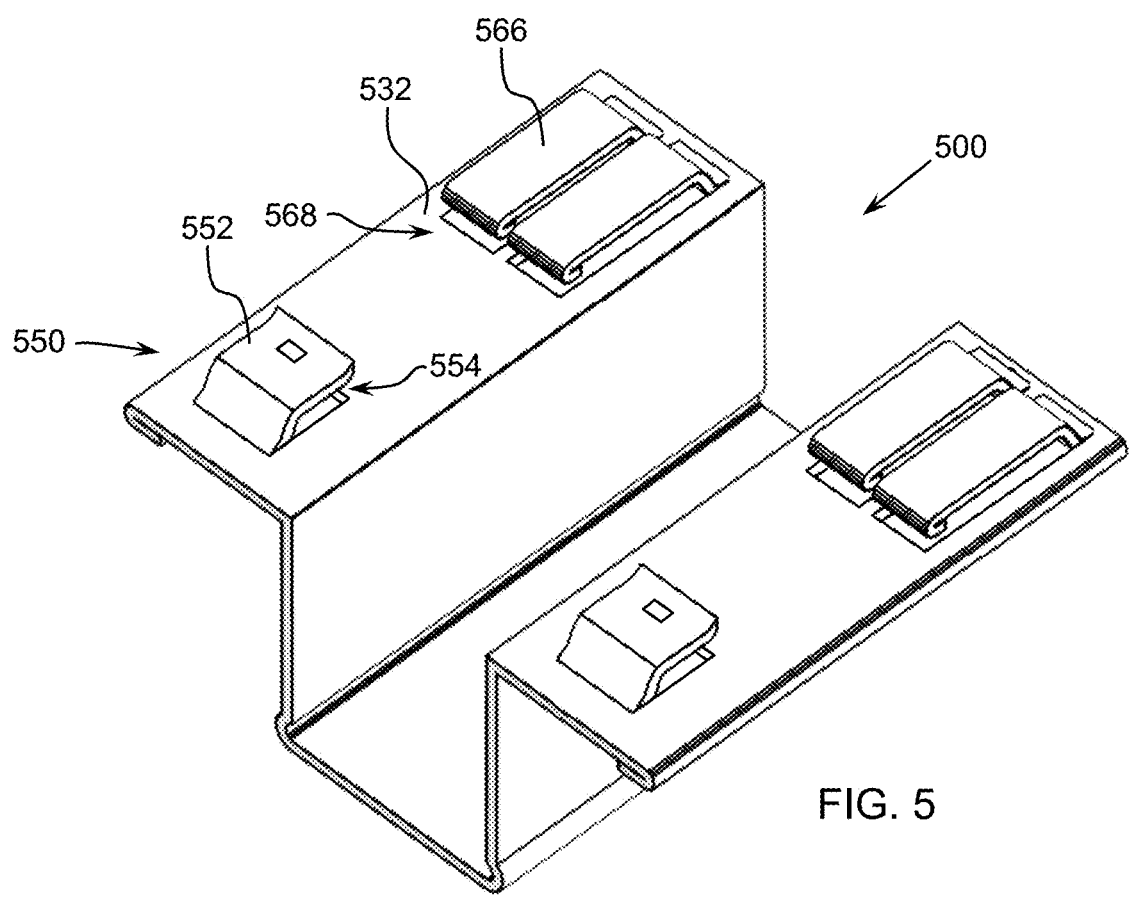
FIG. 5 is a schematic perspective view of a suspension ceiling support clip in accordance with another embodiment of the disclosure.

In certain embodiments as otherwise described herein, the locking tab can be contoured to provide added structural integrity to this component, particularly if the locking tab is formed from a relatively thin material, such as a thin metal sheet. In some embodiments, the locking tab may include one or more stiffening ribs pressed into the surface. For example, locking tab 152 of clip 100, shown in FIGS. 1 and 2, includes two stiffening ribs that extend over the surface of locking tab 152 and onto support surface 132. Alternatively, or in addition, in some embodiments, the locking tab includes a hem or a bend at its outer edge to add stiffness to the locking tab In certain embodiments as otherwise described herein, the support clip includes an opposing locking tab that extends over the support surface, where the opposing locking tab and the support surface form an opposing aperture therebetween that faces the aperture of the locking member. One embodiment of such a support clip is shown in FIG. 5. Ceiling support clip 500 includes locking member 550 at one end of support surface 532. The locking member 550 includes locking tab 552 that extends over the support surface 532 and forms an aperture 554 therebetween. At an opposite end of support surface 532 is an opposing locking tab 566. The opposing locking tab 566 also extends over support surface 532 and forms an opposing aperture 568 between the tab 566 and surface 532. The opposing aperture 568 faces aperture 554 of locking member 550. In ceiling support clip 500, the opposing locking tab 566 is paired with a neighboring locking tab on one side of the clip 500 and another pair of opposing locking tabs is disposed on the far side of the clip 500. In other embodiments of the support clip, a single opposing locking tab is located on each side of the clip. Still in other embodiments, a pair of opposing locking tabs is disposed only on one side of the clip, or a single opposing locking tab is on only one side of the clip.

In certain embodiments as otherwise described herein, the opposing locking tab is longer than the locking tab of the locking member. For example, opposing locking tab 566 is longer than locking tab 552. The additional length of opposing locking tab 666 provides additional depth to the corresponding opposing aperture 568, which allows a beam to be over-inserted into aperture 568, as described in additional detail below.

Figure 1:
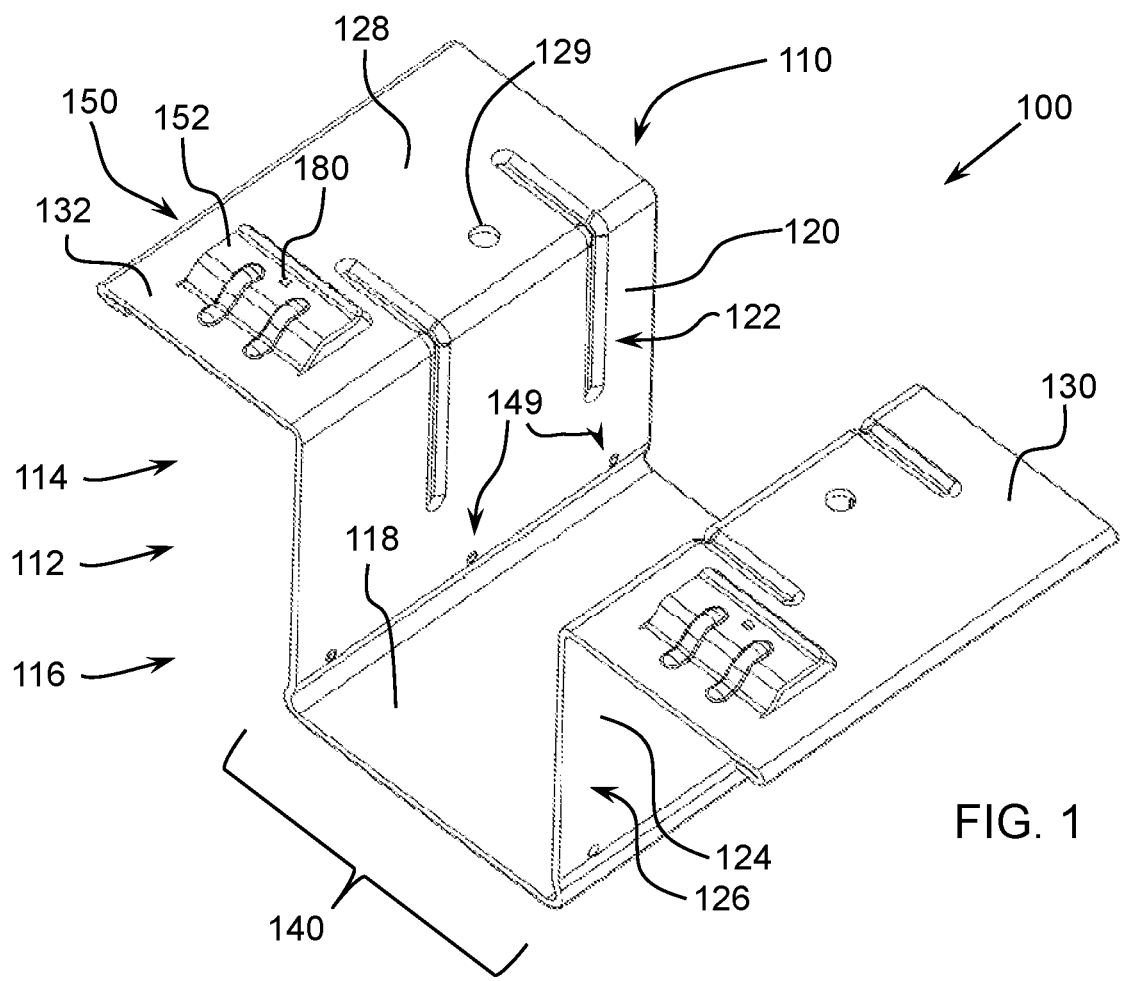
FIG. 1 is a schematic perspective view of a suspension ceiling support clip in accordance with an embodiment of the disclosure.

In certain embodiments as otherwise described herein, the body of the clip includes a channel having an open end and a closed end. For example, the body 110 of clip 100, as shown in FIGS. 1 and 2, includes a channel 112 having an open end 114 and a closed end 116.

In certain embodiments as otherwise described herein, the snap-fit connector is disposed at the closed end of the channel. For example, snap-fit connector 140 of clip 100 is disposed at the closed end 116 of channel 112. Further, channel 112 includes a web 118 at the closed end 116, a first side wall 120 at a first side 122 of the channel, and a second side wall 124 at a second side 126 of the channel. The first and second side walls 120, 124 extend up from respective ends of the web 118 toward the opening of the channel. In some embodiments, the snap-fit connector is adjacent to the web of the channel. For example, grooves 136, 138 that form receptacle 142 of snap-fit connector 140 are disposed immediately adjacent to web 118 at the inside ends of side walls 120, 124.

In certain embodiments as otherwise described herein, the body includes a first flange extending outward from a first side of the channel and the locking member is disposed on the first flange. For example, body 110 of clip 100 includes first flange 128, which extends outward from the first side 122 of channel 112. Further, the locking member 150 is disposed on first flange 128. For example, first flange 128 extends outward from an upper end of the first sidewall 124 at the open end of the channel. In some embodiments, the body includes a second flange that extends outward from a second side of the channel, such as second flange 130 that extends outward from second side 126 of channel 112.

In certain embodiments as otherwise described herein, the first flange 128 provides the support surface 132, and the locking member 150 includes the locking tab 152 that extends over the support surface 132. The aperture 154 is formed between the locking tab 152 and the support surface 132 formed by the first flange 128.

In certain embodiments as otherwise described herein, the clip includes a second locking member and each locking member includes an aperture having an open end. In some embodiments, the open end of the aperture of each locking member may face the same direction. As a result, a component of a beam that is inserted into the aperture of one locking member by a relative movement of the clip and the corresponding beam may also be inserted into the aperture of the other locking member. For example, clip 100 includes a locking member on each flange 128, 130 with apertures that face the same direction, such that a beam can be inserted into both locking members simultaneously from the same direction. In such embodiments, a single relative movement between the clip and the beam may result in two locking members attaching the clip to the beam. Using two attachment points provides added stabilization of the pieces and a more secure coupling.

In certain embodiments as otherwise described herein, the clip is formed from metal, such as steel or aluminum. For example, in some embodiments, the clip is formed from a contoured metal sheet. In such an embodiment, the different features of the clip can be formed by working the metal sheet in different ways. For example, snap-fit connector 140 includes first and second grooves 136, 138 that are formed by bending the metal sheet. Likewise, the locking member 150 includes a locking tab 152 that is formed from a flap that is cut from a portion of the body 110. The components of the locking member 152, such as the catch and stiffening ribs, were integrated into the locking tab 152 using a press.

The term metal sheet may be understood as used herein to refer to a planar metal material that may be bent, cut or folded to form shaped components. The term metal sheet is not limited to any particular thickness and may include materials conventionally referred to as metal foil, sheet metal, metal plate or metal strips. In some embodiments, the metal sheet has a thickness in a range between 5 and 100 thousandths of an inch, or in a range between 10 and 50 thousandths of an inch, or in a range between 15 and 25 thousandths of an inch.

In some embodiments, the support clip is formed from other materials and other processes. For example, in some embodiments, the support clip is extruded, molded, or cast. In some embodiments, the support clip is formed of a plastic or a composite, such as a thermoplastic material, or a fiberglass mat impregnated with a resin. In other embodiments, the support clip is formed as a wire frame. Combinations of such materials and methods are also possible, such as a clip with the snap-fit connector formed as a wire frame attached to a locking member formed from a metal sheet.

Another aspect of the disclosure provides a method of connecting two beams of a suspension ceiling grid. The method includes providing a first beam of a suspension ceiling that extends in a first direction, attaching a support clip according to any of the above embodiments to the first beam using the snap-fit connector, and connecting a second beam that extends in a second direction to the first beam by attaching the second beam to the support clip using the locking member, where the second direction is perpendicular to the first direction. FIGS. 3A and 3B illustrate two beams that are connected by such a method, where FIG. 3A is a front and top perspective view, while FIG. 3B is a rear and top perspective view. First beam 170 extends in a first direction 171 and is attached to second beam 180 that extends in a second direction 181. Support clip 100 is attached to first beam 170 using snap-fit connector 140. Likewise, second beam 180 is attached to support clip 100 using locking member 150. Further, first and second directions 171, 181 are perpendicular to one another.

Figure 6A:
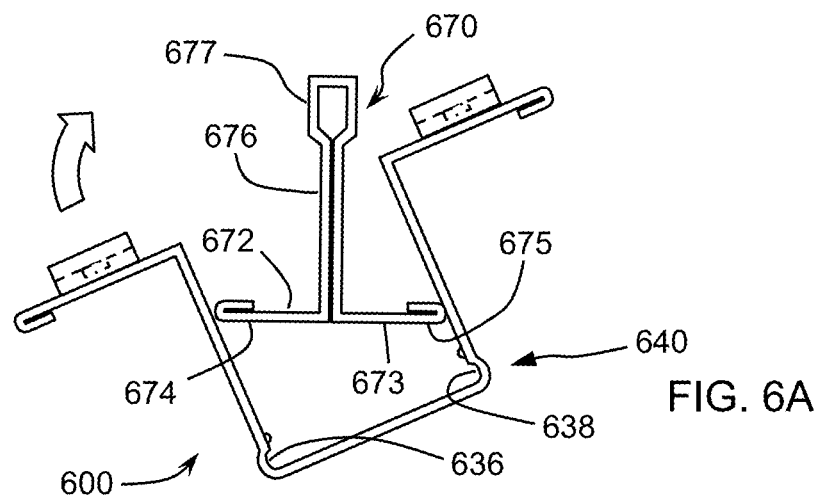
FIG. 6A is a schematic cross-sectional view of a support clip in a first position as it is being attached to a beam in accordance with an embodiment of the disclosure.
Figure 6B:
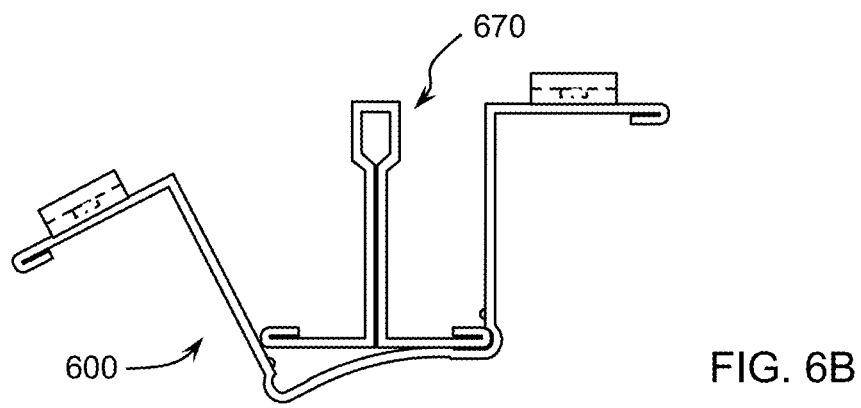
FIG. 6B is a schematic cross-sectional view of the support clip of FIG. 6A in a second position as it is being attached to the beam in accordance with an embodiment of the disclosure.

In certain embodiments as otherwise described herein, the first beam is a T-beam including a first flange and an opposing second flange. The snap-fit connector includes a receptacle having a width and a restricted opening providing access to the receptacle, where the restricted opening has a width that is smaller than the width of the receptacle. In such embodiments, attaching the support clip to the first beam includes deforming the support clip so as to widen the restricted opening and allow the first and second flanges of the first beam to move into the receptacle. Such a method is shown, for example, in FIGS. 6A-6C. FIG. 6A shows an embodiment of a support clip 600 prepared for connection onto a first beam 670. The first beam 670 includes a first flange 672 and an opposing second flange 673. The snap-fit connector 640 includes a receptacle having a width and a restricted opening providing access to the receptacle, where the restricted opening has a width that is smaller than the width of the receptacle, similar to that of clip 100, as shown in FIG. 2. To attach support clip 600 to the first beam 670, the support clip 600 is deformed so as to widen the restricted opening of snap-fit connector 640, as shown in FIG. 6B. This allows the first and second flanges 672, 673 of the first beam 670 to move into the receptacle.

Figure 6C:
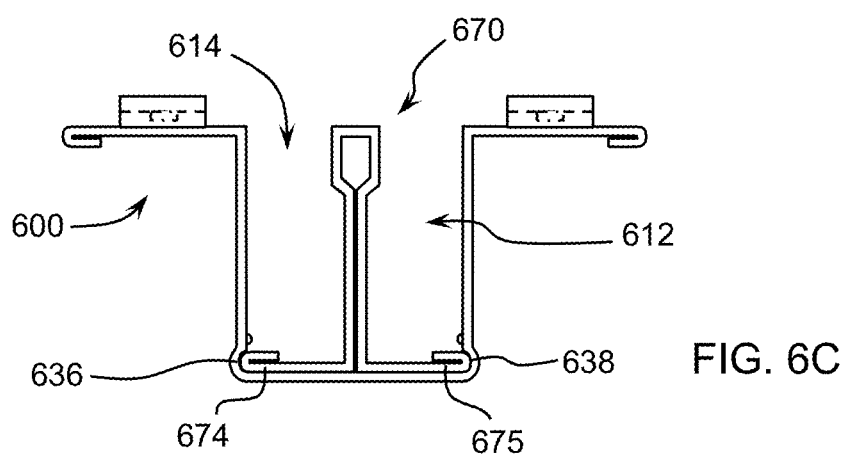
FIG. 6C is a schematic cross-sectional view of the support clip of FIG. 6A attached to the beam in accordance with an embodiment of the disclosure.

In certain embodiments as otherwise described herein, the receptacle includes a first groove and an opposing second groove facing the first groove. In such a case, the attaching of the support clip to the first beam includes placing an end of the first flange of the first beam into the first groove and placing an end of the second flange of the first beam into the second groove. For example, as depicted in FIGS. 6A-6C, connection of support clip 600 to first beam 670 includes placing end 674 of the first flange 672 into the first groove 636 and placing the end 675 of second flange 673 into the second groove 638.

Figure 4B:
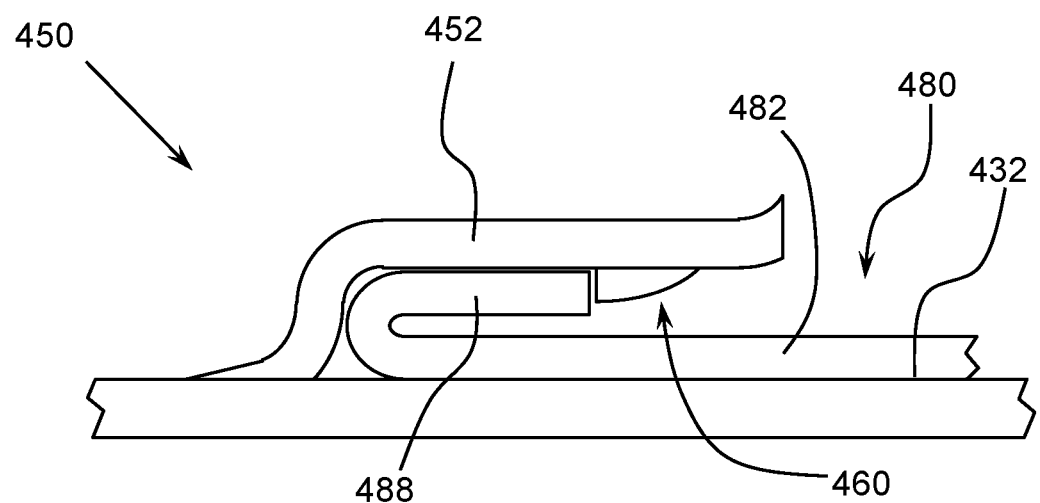
FIG. 4B is the locking member of FIG. 4A receiving a portion of a second beam.

In certain embodiments as otherwise described herein, the second beam is a T-beam and includes a first flange, the body of the support clip includes a support surface, and the locking member includes a locking tab that extends over the support surface. Further, the locking tab and the support surface form an aperture therebetween, and attaching the second beam to the support clip includes inserting the first flange of the second beam into the aperture of the locking member. For example, FIG. 4B shows a portion of a second beam inserted into a locking member in a manner that orients the second beam so as to be perpendicular to the first beam. Locking member 450 includes a locking tab 452 that extends over support surface 432. The locking tab 452 and support surface 432 form an aperture 454 therebetween (see FIG. 4A). Attaching the second beam to the support clip includes inserting the first flange 482 of the second beam 480 into the aperture 454 of the locking member 450, as shown in FIG. 4B. In some embodiments, as shown in FIG. 3A, the T-beam shape of the second beam may also include a second flange and a web that extends upward to a bulb at the upper end of the beam.

In certain embodiments as otherwise described herein, the flange of the second beam includes a folded section forming a hem, the locking tab includes a catch extending into the aperture, and attaching the second beam to the support clip includes inserting the first flange of the second beam into the aperture to such an extent that the hem passes the catch. For example, as shown in FIG. 4B, first flange 482 of the second beam 480 includes a folded section forming a hem 488 and the locking tab 452 includes a catch 460 extending into the aperture 454, as shown in FIG. 4A. Attaching the second beam to the support clip includes inserting the first flange 482 of the second beam 480 into the aperture 454 to such an extent that the hem 488 passes the catch 460. Because the folded edge of the hem 488 is wider than the rest of the first flange 482, the hem 488 may provide a latching edge to cooperate with the catch. Thus, as the first flange 482 is inserted into the aperture 454, the catch 460 may be moved aside until the hem 488 has fully passed the catch 460. Once the flange is fully inserted, the edge of the hem 488 may act as a latch against the catch 460 to prevent unintended removal of the second beam 480 from the support clip. As explained above, the amount of force needed to insert or remove the flange from the aperture 454 of the locking member 450 can be varied by including sharper or softer edges on either side of the catch 460.

Figure 9A:
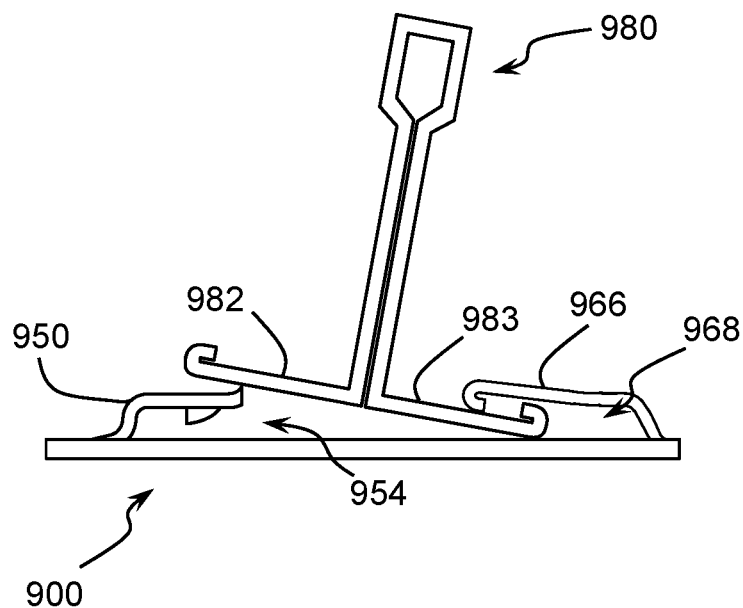
FIG. 9A is a schematic cross-section view of a beam in a first position as it is being attached to a support clip in accordance with an embodiment of the disclosure.
Figure 9B:
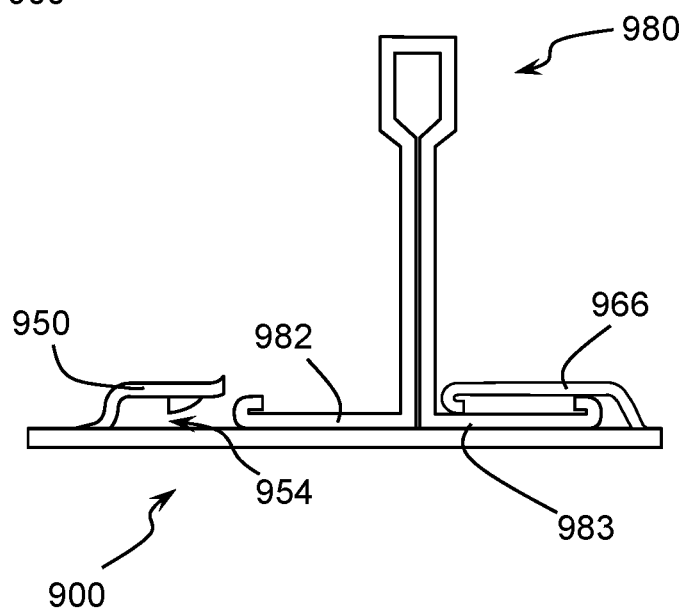
FIG. 9B is a schematic cross-section view of a beam in a second position as it is being attached to the support clip of FIG. 9A.
Figure 9C:
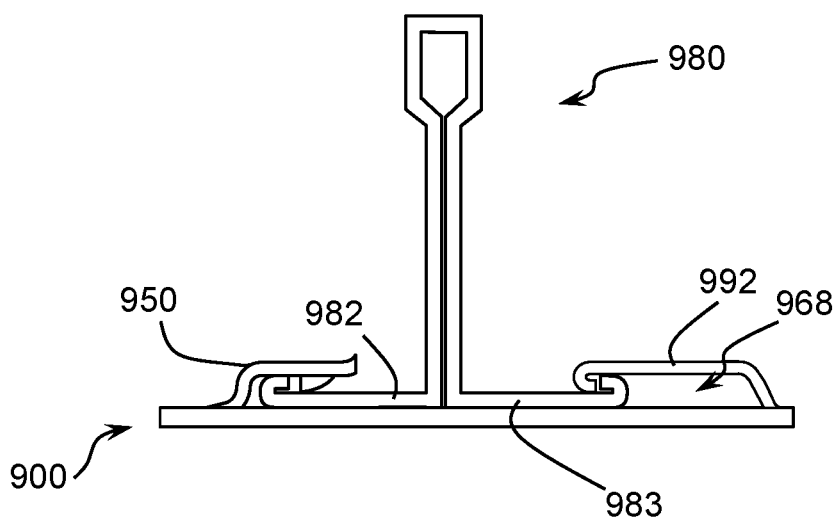
FIG. 9C is a schematic cross-section view of a beam attached to the support clip of FIG. 9A.

In certain embodiments as otherwise described herein, the second beam includes a second flange and the support clip further comprises an opposing locking tab that extends over the support surface. The opposing locking tab and support surface form an opposing aperture therebetween, and attaching the second beam to the support clip includes inserting the second flange of the second beam into the opposing aperture. One embodiment of such a method is shown in FIGS. 9A to 9C, which depicts the connection of a second beam 980 with support clip 900. Second beam 980 includes a first flange 982 and an opposing second flange 983. Similar to support clip 500 shown in FIG. 5, support clip 900 includes an opposing locking tab 966 that extends over support surface 932 and forms an opposing aperture 968 therebetween. When second beam 980 is attached to support clip 900, first flange 982 is inserted into aperture 954 of locking member 950, and second flange 983 is inserted into opposing aperture 968.

In certain embodiments as otherwise described herein, inserting the second flange into the opposing aperture is carried out before inserting the first flange into the aperture of the locking member. For example, in one embodiment depicted in FIGS. 9A to 9C, second flange 983 of second beam 980 is first inserted into opposing aperture 968. To achieve the initial insertion of second flange 983 into opposing aperture 968, the opposing locking tab 966 is flexed upward to accommodate the insertion. Second flange 983 is then fully inserted into opposing aperture 968 before second beam 980 is shifted so that first flange 982 is inserted into first aperture 954 of locking member 950, as shown in FIGS. 9B and 9C.

In certain embodiments as otherwise described herein, inserting the second flange into the opposing aperture includes inserting the second flange to an initial depth in the opposing aperture and then moving the second flange to a final depth in the opposing aperture, wherein the final depth is smaller than the initial depth. For example, in the embodiment of FIGS. 9A to 9C, second flange 983 is inserted into aperture 968 to the initial depth depicted in FIG. 9B. The deep insertion of second flange 983 allows first flange 982 to pass the distal end of the locking tab of locking member 950. Once first flange 982 is past the locking tab and flush with the support surface 932, second beam 980 can be repositioned so that first flange 982 is disposed inside aperture 954, as shown in FIG. 9C.

In certain embodiments as otherwise described herein, the body includes a channel having an open end and a closed end, and the snap-fit connector is disposed at the closed end of the channel. The first beam fits inside the channel when the support clip is attached to the first beam. For example, body 110 of support clip 100 includes a channel 112 having an open end 114 and a closed end 116 and the snap-fit connector 140 is disposed at the closed end 116 of the channel 112, as shown in FIGS. 1 and 2. As depicted in FIGS. 3A and 3B, the first beam 170 fits inside the channel 112 when the support clip 100 is attached to the first beam 170.

In certain embodiments as otherwise described herein, the first beam is a T-beam including a first flange and a second flange, and the first beam is oriented such that the first and second flanges are positioned at a lower end of the first beam. In some embodiments, attaching the support clip to the first beam includes pushing the support clip upward onto a central portion of the first beam so that the first beam fits inside the channel and the open end of the channel faces upward. For example, first beam 670 shown in FIGS. 6A-6C is a T-beam including a first flange 672 and a second flange 673. When assembled, the first beam 670 is oriented such that the first and second flanges thereof are positioned at a lower end of the first beam. In such an embodiment, attaching the support clip 600 to the first beam 670 includes pushing support clip 600 upward onto the first beam 670 so that the first beam 670 fits inside the channel 612 and the open end 614 of the channel faces upward, as shown in FIG. 6C. Such a configuration can make assembly easy for the worker who is installing the ceiling. Typically, workers installing a ceiling are located on the ground and working overhead to install the ceiling. Thus, by having the connection of the support clips and first beams be made by pushing the support clips upward, the workers are able to more easily reach the ceiling grid and interact with the portion of the first beams that is closest to them, namely the flanges.

In addition to the flanges, in certain embodiments, the first beam also includes a web extending upward away from the flanges and a bulb disposed at the upper end of the T-beam. For example, first beam 670 includes a web 676 extending upward form the flanges 672, 673 and a bulb 677 disposed at the upper end of the T-beam. In some embodiments, the height of the channel of the support clip is configured such that the entirety of the first beam, including the bulb, is disposed within the channel. Accordingly, the first beam does not interfere with any beam that passes over the top of the support clip, such as a second beam as shown in FIGS. 3A and 3B.

In certain embodiments as otherwise described herein, the body of the support clip includes a first flange extending outward from a first side of the channel, and the locking member is disposed on a top side of the first flange of the support clip. For example, the body 110 of support clip 100 includes a first flange 128 extending outward from a first side 122 of channel 112, and locking member 150 is disposed on a top side of first flange 128.

In certain embodiments as otherwise described herein, attaching the second beam to the support clip positions the second beam above the first beam. For example, as shown in FIGS. 3A and 3B, the attachment of the second beam 180 to the support clip 100 positions the second beam 180 above the first beam 170. Specifically, the second beam 180 passes over the first beam 170 when the clip 100 connects the beams to one another. Such a positioning allows the second beam to connect to a number of different first beams, thereby providing support for a group of beams extending in one direction. Moreover, the lower position of the first beam allows this beam to remain as a primary support surface for the installation of drywall or another ceiling panel.

In certain embodiments as otherwise described herein, attaching the second beam to the support clip positions the second beam so as to close the open end of the channel. For example, attaching the second beam 180 to the support clip 100 positions the second beam 180 so as to close the open end of the channel of clip 100. For example, with the second beam 180 passing over the first beam 170, the first beam 170 is surrounded both by the channel of clip 100 on its lower end and sides and by the second beam 180 on top.

In certain embodiments as otherwise described herein, once the first and second beams are connected using the support clip, these components can be more permanently attached to one another using additional fasteners. For example, the web of the channel can be secured to either or both of the flanges of the first beam using screws. Specifically, the installer may insert a screw through the web into the first beam. In some embodiments, the web can include one or more holes for receiving such screws. Likewise, either or both of the flanges of the support clip can be secured to the flanges of the second beam using screws. Again, the support clip can include one or more holes for receiving a screw to make such a connection. For example, first flange 128 of support clip 100 includes a hole 129 for receiving a mechanical fastener, as shown in FIG. 1. Further, as depicted in FIG. 3B, mechanical fasteners 131 pass through the flanges of support clip 100 and the second flange of second beam 180 to secure support clip 100 to second beam 180. In the illustrated embodiment, mechanical fasteners are included on both sides of the channel of support clip 100. In other embodiments, only a single mechanical fasteners secures the support clip to the second beam. Still, in other embodiments, four mechanical fasteners are used to secure both flanges of the T-beam of the second beam to both sides of the support clip.

While the locking member has been described herein with respect to a locking tab with a catch, based on the disclosure herein, the person of ordinary skill in the art will appreciate that the locking member can take a variety of forms, and that it can cooperate with a variety of structures of the second beam. For example, in certain embodiments, the locking member is in the form of a hook configured to interact with an aperture (e.g., a hole or a recess) on the second beam. In other embodiments, the locking member is a post having a receiving hole, where the post is configured to interact with an aperture on the second beam in combination with a cotter pin. In certain embodiments, the locking member is a latch. In other embodiments, the locking member is a component of a reclosable fastener, e.g., an array of hooks of a hook and loop pair, or an array of interlocking stems. In other embodiments, the locking member is a toggle fastener.

Figure 7A:
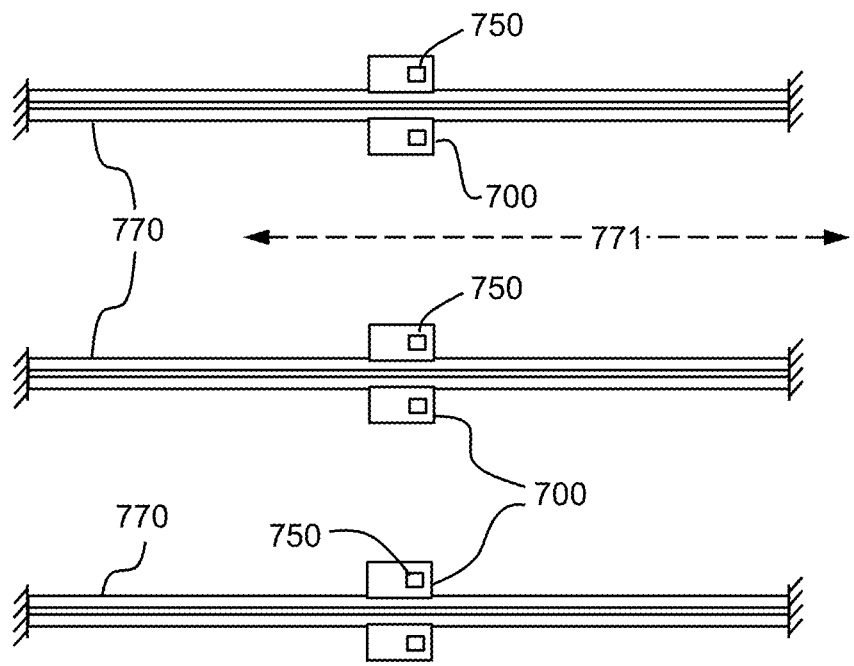
FIG. 7A is a schematic top view of components of a suspension ceiling grid in accordance with an embodiment of the disclosure.
Figure 7B:
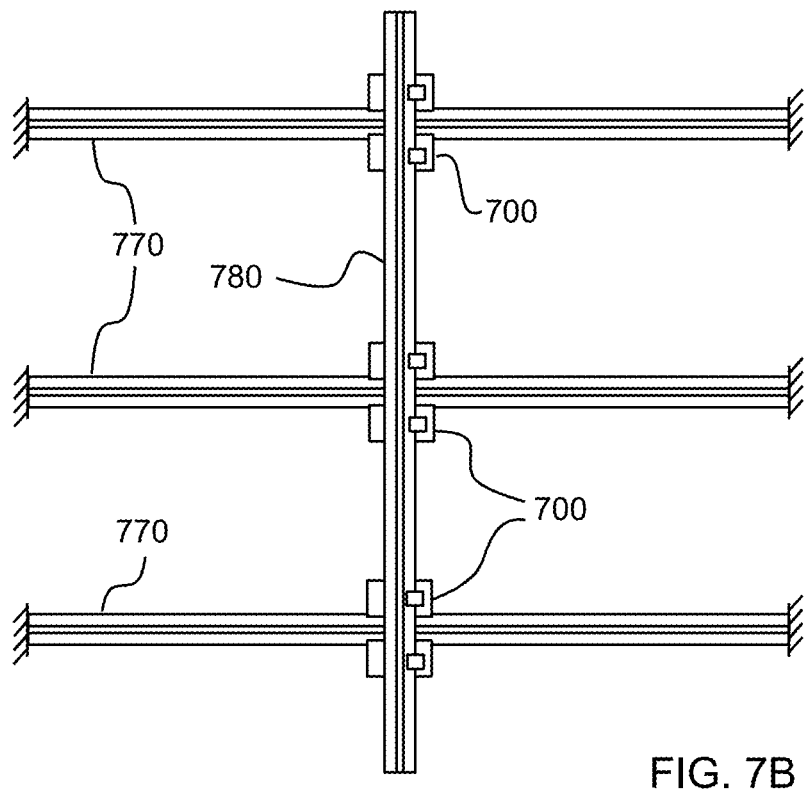
FIG. 7B is a schematic top view of the components of FIG. 7A with an additional component of a suspension ceiling grid in accordance with an embodiment of the disclosure.

Another aspect of the disclosure provides a method of positioning components of a suspension ceiling grid. In one embodiment, such a method is illustrated in FIGS. 7A and 7B in combination with the other drawings. The method includes providing a plurality of first beams 770 of a suspension ceiling that each extend in a first direction 771. A second beam 780 is connected to the plurality of first beams using any of the methods described above. For example, a support clip 700 is attached to each of the first beams 770, as shown in FIG. 7A. Each support clip 700 includes a body and a snap-fit connector disposed on the body that is configured to receive the respective first beam 770. Each support clip 700 also includes at least one locking member 750 that is configured to receive the second beam. The support clip 700 is attached to each of the first beams using the snap-fit connector of the support clip. The second beam 780 is attached to each of the support clips 700 using the respective locking members 750 such that the second beam 780 extends in a second direction that is perpendicular or perpendicular to the first direction.

Figure 8A:
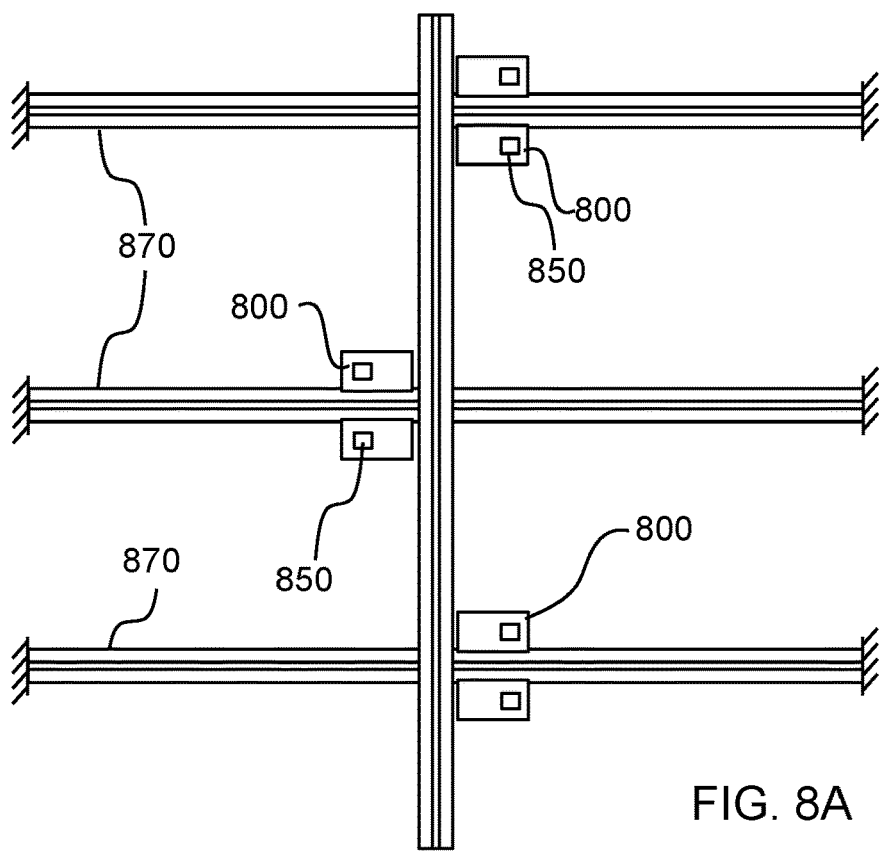
FIG. 8A is a schematic top view of components of a suspension ceiling grid in a first position in accordance with another embodiment of the disclosure.
Figure 8B:
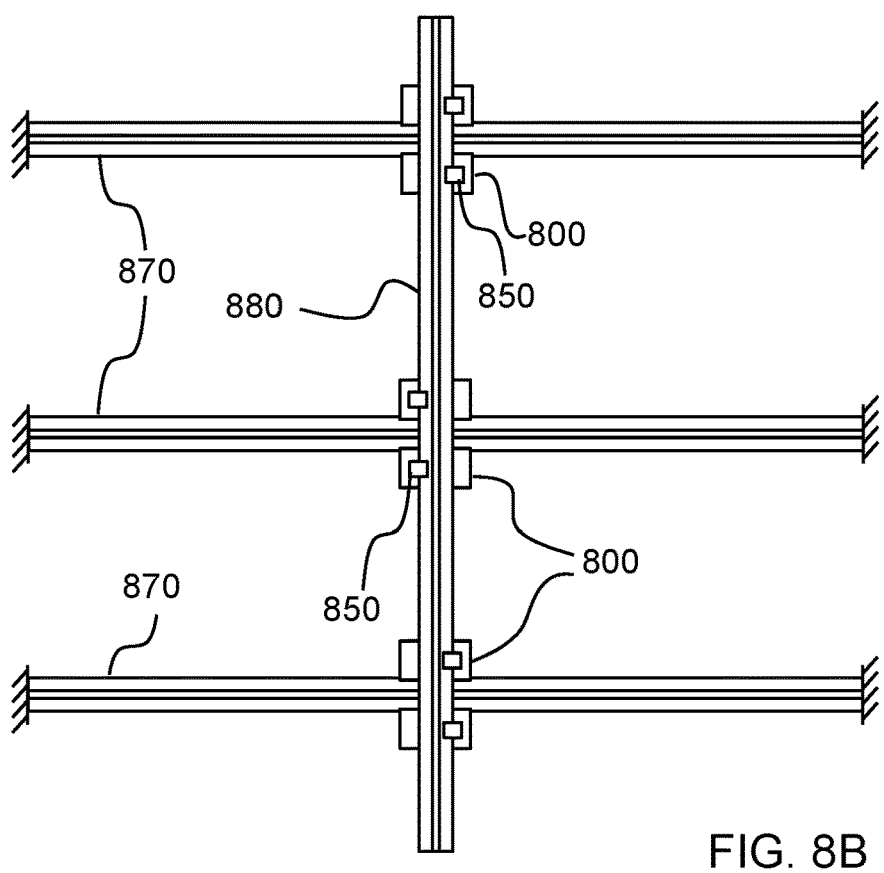
FIG. 8B is a schematic top view of the components of the suspension ceiling grid of FIG. 8A in a second position in accordance with another embodiment of the disclosure.

In certain embodiments as otherwise disclosed herein, the support clips are attached to respective first beams of a ceiling grid such that respective locking members of the support clips are disposed on alternating sides of a second beam that is perpendicular to the first beams. For example, as shown in FIGS. 8A and 8B, support clips 800 are attached to respective first beams 870 in a manner that places the respective locking members 850 on alternating sides of a second beam 880. In one embodiment, to make the connection between the support clips 800 and the second beam 880, the alternating support clips 800 are attached to respective first beams 870 in a staggered relationship, as shown in FIG. 8A. Second beam 880 is then set in place above the first beams 870 and support clips 800 are slid toward second beam 880 such that the respective locking members 850 attach to second beam 880, as shown in FIG. 8B.

In certain embodiments as otherwise described herein, the first beams are anchored to the sidewalls of a room or another support structure prior to connection with the support clips and second beam. For example, first beams 770, as shown in FIGS. 7A and 7B are anchored to the side walls of the room or another support structure prior to connection with the support clips 700 or second beam 780. For flexibility in the installation, the anchoring of the first beams prior to connection with the second beam can be temporary, for example with clips. Alternatively, the installation of the support clips and second beam can be accomplished on first beams that have already been permanently installed. After connection of the first beams to the second beam using the support clips, fasteners can be used to further secure the connections, as described above. Likewise, for additional support, hanger wire may be used to provide support to the second beam from an overhead structural member. The hanger wire may then provide support for the entire grid by way of the second beam and support clips.

Another aspect of the present disclosure provides a suspension ceiling grid. Such a grid is shown in FIGS. 3A, 3B, 7B and 8B. The grid includes a plurality of first beams extending in a first direction, a respective support clip, as described above, attached to each of the first beams; and a second beam extending in a second direction and attached to each of the support dips.

In certain embodiments, such a suspension ceiling grid includes a plurality of first beams that span a space from a first structural support, such as a wall, to another structural support, such as an opposing wall. The first beams are in the form of T-beams and the flanges of the T-beams are used for the attachment of a ceiling structure, such as drywall. For example, in some embodiments, the drywall is attached to the flanges of the first beams using mechanical fasteners. In other embodiments, the ceiling structure may take another form.

The second beams of the ceiling grid are located above the first beams, opposite the ceiling structure, and provide additional support to the ceiling grid. For example, in some embodiments, the second beams are disposed at a midpoint along the first beams between the opposing structural supports or walls. The attachment of the first beams to the second beams using the support clips provide added strength allowing the first beams to span longer distances between the opposing support structures.

In some embodiments, the second beams are supported by hangers attached to an overhead structure that assist to hold the weight of ceiling grid and ceiling structure. These hangers are spaced along the second beam at an appropriate distance based on the load carried by the ceiling structure. For example, for first beams that span longer distances or for heavier ceiling structures, the hangers are spaced closer together. For lighter loads or shorter unsupported spans, the hangers can be spaced further.

In certain embodiments, the second beams are also in the form of T-beams. The use of T-beams as the second beams provides added strength compared to simpler cross-beam supports. The T-beams help resist both bending and torsional loads. As a result, a ceiling grid formed according to the disclosure can hold higher loads and allows longer spacing between hangers than ceiling grid with conventional midspan supports. For example, one conventional design of a midspan support includes a beam having a cross section including a web with a bulb at the top. The web includes apertures that slide over the respective bulbs of main beams (or first beams). Similar to the second beams described above, the conventional midspan supports provide added strength and can be supported by spaced hangers. However, ceiling structures made using this conventional configuration, without the support clips of the present disclosure or the use of T-beams as the midspan supports, cannot support the loads of ceiling grids made in accordance with the disclosure.

For example, Table 1 shows a comparison of the hanger spacing that is required to hold various ceiling structure loads for ceiling grids where the first beams have an unsupported span of a range of different distances. The table compares a ceiling grid according to an embodiment of the disclosure having the configuration shown in FIGS. 3A and 3B. The first and second beams are both steel T-beams having a width of ~1.5" and a height of ~1.5" and a wall thickness of ~0.020". The support clip is made of steel and the channel is ~1.5" wide to accommodate the T-beam width. With the addition of the two flanges, the total width of the support clip is ~3.6" and the length is ~2". In addition to using the locking members, the second beams are also secured to the support clip using at least one screw.

The conventional configuration uses comparable T-beams as the main beams (or first beams) of the ceiling grid. However, the midspan supports are conventional 2" tall supports having a wall thickness of 0.033" with a web and an upper bulb. The midspan supports of the conventional grid are attached to the main beams using apertures in the midspan support, as described above. As shown in Table 1, the ceiling support of the disclosure allows greater spacing between hangers in all instances. Indeed, with heavy ceiling loads of 5 lbs. per square foot and short unsupported spans of 3.5 to 4 feet, the ceiling grid of the disclosure allows for at least twice the spacing between hangers as the conventional design. Moreover, for heavy ceiling loads of 5 lbs. per square foot, the ceiling grid of the disclosure can allow for unsupported spans up to 8 feet, whereas the conventional ceiling grid can accommodate unsupported spans of no more than 6 feet.

TABLE 1

Hanger Spacing for Various Loads and Unsupported Span Lengths

| Embodiment of the Disclosure | | | | | Conventional Design | | | | |
|---|---|---|---|---|---|---|---|---|---|
| Unsupported Spans (ft) | Hanger Spacing (in) | | | | Unsupported Spans (ft) | Hanger Spacing (in) | | | |
| | 5 psf | 2.5 psf | 2 psf | 1.4 psf | | 5 psf | 2.5 psf | 2 psf | 1.4 psf |
| 3.5 | 68 | 76 | 76 | 76 | 3.5 | 32 | 48 | 48 | 48 |
| 4 | 64 | 76 | 76 | 76 | 4 | 32 | 48 | 48 | 48 |
| 4.5 | 60 | 76 | 76 | 76 | 4.5 | 32 | 48 | 48 | 48 |
| 5 | 60 | 76 | 76 | 76 | 5 | 32 | 48 | 48 | 48 |

TABLE 1-continued

Hanger Spacing for Various Loads and Unsupported Span Lengths

| Embodiment of the Disclosure | | | | | Conventional Design | | | | |
|---|---|---|---|---|---|---|---|---|---|
| Unsupported Spans (ft) | Hanger Spacing (in) | | | | Unsupported Spans (ft) | Hanger Spacing (in) | | | |
| | 5 psf | 2.5 psf | 2 psf | 1.4 psf | | 5 psf | 2.5 psf | 2 psf | 1.4 psf |
| 5.5 | 56 | 72 | 76 | 76 | 5.5 | 32 | 48 | 48 | 48 |
| 6 | 56 | 68 | 76 | 76 | 6 | 32 | 48 | 48 | 48 |
| 6.5 | 52 | 68 | 72 | 76 | 6.5 | N/A | 48 | 48 | 48 |
| 7 | 52 | 68 | 72 | 76 | 7 | N/A | 48 | 48 | 48 |
| 7.5 | 52 | 64 | 68 | 76 | 7.5 | N/A | 48 | 48 | 48 |
| 8 | 48 | 64 | 68 | 76 | 8 | N/A | 48 | 48 | 48 |

Various aspects of the disclosure are further described by the following enumerated embodiments, which can be combined in any number and in any fashion that is not technically or logically inconsistent.

Embodiment 1

A suspension ceiling support clip comprising:
a body;
a snap-fit connector disposed on the body and configured to receive a first beam of a suspension ceiling that extends in a first direction; and
a locking member disposed on the body and configured to receive a second beam of the suspension ceiling that extends in a second direction, wherein the first direction is perpendicular to the second direction.

Embodiment 2

The suspension ceiling support clip according to Embodiment 1, wherein the snap-fit connector includes:
a receptacle having a width, and
a restricted opening providing access to the receptacle, wherein the restricted opening has a width that is smaller than the width of the receptacle.

Embodiment 3

The suspension ceiling support clip according to Embodiment 2, wherein the receptacle includes a first groove and an opposing second groove facing the first groove, and wherein the width of the receptacle extends from an inner surface of the first groove to an inner surface of the second groove.

Embodiment 4

The suspension ceiling support clip according to Embodiment 2 or Embodiment 3, wherein the restricted opening includes a plurality of protrusions adjacent to the receptacle.

Embodiment 5

The suspension ceiling support clip according to any of Embodiments 1 to 4, wherein the body includes a support surface and the locking member includes a locking tab that extends over the support surface, and wherein the locking tab and the support surface form an aperture therebetween.

Embodiment 6

The suspension ceiling support clip according to Embodiment 5, wherein the locking tab includes a catch extending into the aperture.

Embodiment 7

The suspension ceiling support clip according to Embodiment 6, wherein the catch includes a soft edge facing an open end of the aperture and a sharp edge facing the inner end of the aperture.

Embodiment 8

The suspension ceiling support clip according to any of Embodiments 5 to 7, further comprising an opposing locking tab that extends over the support surface, and wherein the opposing locking tab and the support surface form an opposing aperture therebetween that faces the aperture of the locking member.

Embodiment 9

The suspension ceiling support clip according to Embodiment 8, wherein the opposing locking tab is longer than the locking tab of the locking member.

Embodiment 10

The suspension ceiling support clip according to any of Embodiments 1 to 9, wherein the body includes a channel having an open end and a closed end.

Embodiment 11

The suspension ceiling support clip according to Embodiment 10, wherein the snap-fit connector is disposed at the closed end of the channel.

Embodiment 12

The suspension ceiling support clip according to Embodiment 11, wherein the body includes a first flange extending outward from a first side of the channel, and wherein the locking member is disposed on the first flange.

Embodiment 13

The suspension ceiling support clip according to Embodiment 12, wherein the first flange provides a support surface, and wherein the locking member includes a locking tab that extends over the support surface and forms an aperture between the locking tab and the support surface.

Embodiment 14

The suspension ceiling support clip according to Embodiment 12 or Embodiment 13, wherein the first flange is stabilized by a stiffening rib that extends over a portion of the first flange and a portion of the first side of the channel.

Embodiment 15

The suspension ceiling support clip according to any of Embodiments 1 to 14, wherein the clip further comprises a second locking member, wherein each of the first and second locking members includes an aperture having an open end, and wherein the open end of the aperture of each locking member faces the same direction.

Embodiment 16

The suspension ceiling support clip according to any of Embodiments 1 to 15, wherein the support clip is formed from a contoured metal sheet.

Embodiment 17

The suspension ceiling support clip according to Embodiment 16, wherein the snap-fit connector includes first and second grooves formed by bends in the metal sheet.

Embodiment 18

The suspension ceiling support clip according to Embodiment 16 or Embodiment 17, wherein the locking member includes a locking tab formed from a flap that is cut from a portion of the body.

Embodiment 19

A method of connecting two beams of a suspension ceiling grid, the method comprising:
providing a first beam of a suspension ceiling grid that extends in a first direction;
attaching a support clip according to any of Embodiments 1 to 18 to the first beam using the snap-fit connector of the support clip; and
connecting a second beam that extends in a second direction to the first beam by attaching the second beam to the support clip using the locking member,
wherein the second direction is perpendicular to the first direction.

Embodiment 20

The method according to Embodiment 18, wherein the first beam is a T-beam including a first flange and an opposing second flange, wherein the snap-fit connector includes a receptacle having a width and a restricted opening providing access to the receptacle, wherein the restricted opening has a width that is smaller than the width of the receptacle, and wherein the attaching the support clip to the first beam includes deforming the support clip so as to widen the restricted opening and allow the first and second flanges of the first beam to move into the receptacle.

Embodiment 21

The method according to Embodiment 19, wherein the receptacle includes a first groove and an opposing second groove facing the first groove, and wherein the attaching the support clip to the first beam includes placing an end of the first flange of the first beam into the first groove and placing an end of the second flange of the first beam into the second groove.

Embodiment 22

The method according to any of Embodiments 19 to 21, wherein the second beam is a T-beam and includes a first flange, wherein the body of the support clip includes a support surface and the locking member includes a locking tab that extends over the support surface, wherein the locking tab and the support surface form an aperture therebetween, and wherein the attaching the second beam to the support clip includes inserting the first flange of the second beam into the aperture of the locking member.

Embodiment 23

The method according to Embodiment 22, wherein the first flange of the second beam includes a folded section forming a hem, wherein the locking tab includes a catch extending into the aperture, and wherein the attaching the second beam to the support clip includes inserting the first flange of the second beam into the aperture to such an extent that the hem passes the catch.

Embodiment 24

The method according to Embodiment 22 or Embodiment 23, wherein the second beam includes a second flange, wherein the support clip further comprises an opposing locking tab that extends over the support surface, wherein the opposing locking tab and the support surface form an opposing aperture therebetween, and wherein the attaching the second beam to the support clip includes inserting the second flange of the second beam into the opposing aperture.

Embodiment 25

The method according to Embodiment 24, wherein the inserting the second flange into the opposing aperture is carried out before inserting the first flange into the aperture of the locking member.

Embodiment 26

The method according to Embodiment 25, wherein the inserting the second flange into the opposing aperture includes inserting the second flange to an initial depth in the opposing aperture and then moving the second flange to a final depth in the opposing aperture, wherein the final depth is smaller than the initial depth.

Embodiment 27

The method according to any of Embodiments 19 to 26, wherein the body includes a channel having an open end and a closed end, wherein the snap-fit connector is disposed at the closed end of the channel, and wherein the first beam fits inside the channel when the support clip is attached to the first beam.

Embodiment 28

The method according to Embodiment 27, wherein the first beam is a T-beam including a first flange and a second flange, wherein the first beam is oriented such that the first and second flanges thereof are positioned at a lower end of the first beam, and wherein attaching the support clip to the first beam includes pushing the support clip upward onto a central portion of the first beam so that the first beam fits inside the channel and the open end of the channel faces upward.

Embodiment 29

The method according to Embodiment 27 or Embodiment 28, wherein the body of the support clip includes a first flange extending outward from a first side of the channel, and wherein the locking member is disposed on a top side of the first flange of the support clip.

Embodiment 30

The method according to Embodiment 29, wherein attaching the second beam to the support clip positions the second beam above the first beam.

Embodiment 31

The method according to Embodiment 30, wherein attaching the second beam to the support clip positions the second beam so as to close the open end of the channel.

Embodiment 32

A method of positioning components of a suspension ceiling grid, the method comprising: providing a plurality of first beams of a suspension ceiling that each extend in a first direction; connecting a second beam to the plurality of first beams using a method according to any of Embodiments 19 to 31.

Embodiment 33

A suspension ceiling grid comprising:
a plurality of first beams extending in a first direction;
a respective support clip according to any of Embodiments 1 to 18 attached to each of the first beams; and
a second beam extending in a second direction and attached to each of the support clips.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A suspension ceiling assembly comprising:
a first beam of a suspension ceiling grid that extends in a first direction, the first beam being a T-beam including a first flange, an opposing second flange, and a web that extends upward from the flanges to a bulb;
a second beam of the suspension ceiling grid that extends in a second direction, wherein the first direction is perpendicular to the second direction; and
a support clip coupled to the first beam and the second beam, the support clip comprising:
a body including a channel having an open end and a closed end, the channel including a web at the closed end and first and second sidewalls extending up from the web;
a snap-fit connector disposed on the body at the closed end of the channel, the snap-fit connector including a receptacle having a width and a restricted opening providing access to the receptacle such that the first and second flanges of the first beam are received in the receptacle; and
a locking member disposed on the body and receiving the second beam of the suspension ceiling.

2. The suspension ceiling assembly according to claim 1, wherein the restricted opening has a width that is smaller than the width of the receptacle.

3. The suspension ceiling assembly according to claim 2, wherein the receptacle includes a first groove at a first end of the web and an opposing second groove at a second end of the web that faces the first groove, and
wherein the width of the receptacle extends from an inner surface of the first groove to an inner surface of the second groove.

4. The suspension ceiling assembly according to claim 1, wherein the body includes a support surface and the locking member includes a locking tab that extends over the support surface, and
wherein the locking tab and the support surface form an aperture therebetween.

5. The suspension ceiling assembly according to claim 4, wherein the locking tab includes a catch extending into the aperture, and wherein the catch includes a soft edge facing an open end of the aperture and a sharp edge facing the inner end of the aperture.

6. The suspension ceiling assembly according to claim 4, further comprising an opposing locking tab that extends over the support surface, and
wherein the opposing locking tab and the support surface form an opposing aperture therebetween that faces the aperture of the locking member.

7. The suspension ceiling assembly according to claim 6, wherein the opposing locking tab is longer than the locking tab of the locking member.

8. The suspension ceiling assembly according to claim 1, wherein the body includes a first flange extending outward from a first side of the channel, and
wherein the locking member is disposed on the first flange.

9. The suspension ceiling assembly according to claim 8, wherein the first flange provides a support surface, and
wherein the locking member includes a locking tab that extends over the support surface and forms an aperture between the locking tab and the support surface.

10. The suspension ceiling assembly according to claim 1, wherein the clip further comprises a second locking member,
wherein each of the first and second locking members includes an aperture having an open end, and
wherein the open end of the aperture of each locking member faces the same direction.

11. A method of connecting two beams of a suspension ceiling grid, the method comprising:
providing a first beam of a suspension ceiling grid that extends in a first direction, the first beam being a T-beam including a first flange, an opposing second flange, and a web that extends up to a bulb;
attaching a support clip to the first beam, wherein the support clip comprises:
a body including a channel having an open end and a closed end, the channel including a web at the closed end and first and second sidewalls extending up from the web;

a snap-fit connector disposed on the body at the closed end of the channel, the snap-fit connector including a receptacle having a width and a restricted opening providing access to the receptacle, wherein the restricted opening has a width that is smaller than the width of the receptacle, and a locking member disposed on the body, wherein the support clip is attached to the first beam using the snap-fit connector of the support clip such that the first and second flanges of the first beam are received in the snap-fit connector, and attaching the support clip to the first beam includes deforming the support clip so as to widen the restricted opening and allow the first and second flanges of the first beam to move into the receptacle; and connecting a second beam that extends in a second direction to the first beam by attaching the second beam to the support clip using the locking member, wherein the second direction is perpendicular to the first direction.

12. The method according to claim 11, wherein the receptacle includes a first groove and an opposing second groove facing the first groove, and wherein the attaching the support clip to the first beam includes placing an end of the first flange of the first beam into the first groove and placing an end of the second flange of the first beam into the second groove.

13. The method according to claim 11, wherein the second beam is a T-beam and includes a first flange, wherein the body of the support clip includes a support surface and the locking member includes a locking tab that extends over the support surface, wherein the locking tab and the support surface form an aperture therebetween, and wherein the attaching the second beam to the support clip includes inserting the first flange of the second beam into the aperture of the locking member.

14. The method according to claim 11, wherein the first beam fits inside the channel when the support clip is attached to the first beam.

15. The method according to claim 11, wherein the first beam is oriented such that the first and second flanges thereof are positioned at a lower end of the first beam, and wherein attaching the support clip to the first beam includes pushing the support clip upward onto a central portion of the first beam so that the first beam fits inside the channel and the open end of the channel faces upward.

16. A method of positioning components of a suspension ceiling grid, the method comprising:

providing a plurality of first beams of a suspension ceiling that each extend in a first direction;

connecting a second beam to the plurality of first beams using a method according to claim 11.

17. The suspension ceiling assembly according to claim 1, wherein the first beam is one of a plurality of first beams extending in the first direction;

a respective support clip is attached to each of the first beams; and the second beam is attached to each of the support clips.

* * * * *